Feb. 20, 1951     H. B. TORRESEN     2,542,376
MAXIMUM SHEAR RIVET

Filed Aug. 9, 1944

INVENTOR.
HESTER B. TORRESEN
BY Edwin Coates
ATTORNEY.

Patented Feb. 20, 1951

2,542,376

UNITED STATES PATENT OFFICE 2,542,376

MAXIMUM SHEAR RIVET

Hester B. Torresen, Santa Monica, Calif.

Application August 9, 1944, Serial No. 548,667

2 Claims. (Cl. 78—46)

This invention relates to a novel rivet and method of riveting, and more particularly to such rivet and method for use in aircraft construction.

Most aircraft at the present time are constructed largely of aluminum alloy material. The usual means for uniting the structural elements are headed rivets of various aluminum alloys adapted to be inserted in openings in the structural elements, after which the free ends of their shanks are upset to retain the rivets in place and to hold the structural elements in permanent, tight relationship.

Until recently these structural elements have been comparatively thin sheets or plates which have not had very high shear strength between rivet holes. It has been possible to use aluminum alloy rivets of a harder and stronger composition than the sheets, and their shear strength has been high enough to withstand any stresses imposed by the sheets.

The increasingly higher loading of present day aircraft has necessitated various changes in design, among which is the use of very thick plates for principal structural members, such as wing spars. Even the largest aluminum alloy rivets which it is practical to use in these installations do not have sufficient shear strength to take the loads. The first substitute was the obvious one of using ordinary steel bolts and nuts. The shear strength of steel bolts is satisfactory, but the large bolt heads and nuts add a great deal of undesirable weight to the total construction.

The use of a bolt and nut has also proved to be of value in the connection of thin sheets in many instances, particularly in cases where they are subjected to the forces imposed by vibration. In such circumstances the security of the joint depends largely on the friction between the joints which gives resistance to slippage. High tension in the connecting member is a prime requisite for obtaining this friction and the bolt and nut type connection is satisfactory in this regard.

In an endeavor to retain the advantage of the steel bolt and nut while accomplishing a reduction in weight, a rivet was designed and has been put into use which consists of a steel pin having a cylindrical shank with a thin head at one end and an annular depression at the other. After the shank has been passed thru the openings in the structure, a tubular collar of aluminum alloy is slipped over the free end and then swaged into the annular depression. The swaging operation also brings it into contact with one surface of the structure which is being riveted. The device just described has good shear value but certain drawbacks are inherent in its construction and application. Because of the fact that it is being radially upset into the depression it cannot be urged into as high a compressive engagement with the structure as is necessary to insure an absolutely tight joint. The result is that the joint is allowed to "work" and becomes progressively looser. The working of the joint has the further result of loosening the attachment of the collar to the shank.

The general object of the present invention is to provide a rivet having the advantages of the rivet described above but eliminating its drawbacks.

A more specific object is to provide a rivet which will make a suitably tight joint between the structural elements to be united.

Another object is to provide a rivet having a more satisfactory connection between the collar and the shank.

A further object is to produce a riveted joint which will be and remain free from a tendency to "work."

An additional object is to provide a method of riveting which will accomplish these desirable results.

It is still another object of the invention to provide a rivet of high shear strength which requires a minimum number of special parts and operations in its manufacture.

The manner in which these objects are accomplished will be apparent from the following description taken in connection with the accompanying drawing in which.

Figure 1:
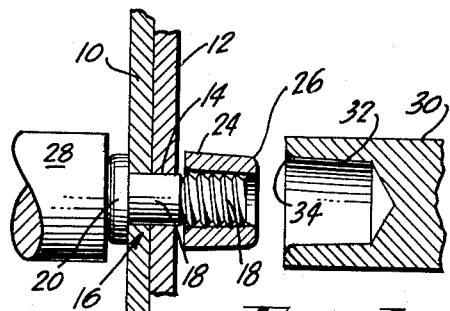
Fig. 1 is an elevational view partly in section of a pair of apertured plates with the rivet parts in place ready for attachment, together with the riveting tools used in the process.

In Figure 1 the plates 10 and 12 representing, for instance, structural parts of an airplane are provided with openings 14 for the reception of a fastening means. The rivet 16 is a relatively hard, high strength pin which may be made of alloy steel. The pin consists of a shank 18 of circular section, a flattened head 20 and a threaded end 22. The end 22 may be cylindrical or slightly tapered and is formed in the same general manner as hardened self-tapping screws which are well known. One of the advantages of this construction is that it can be made with screw-making machinery which is now available in considerable quantity.

Figure 6:
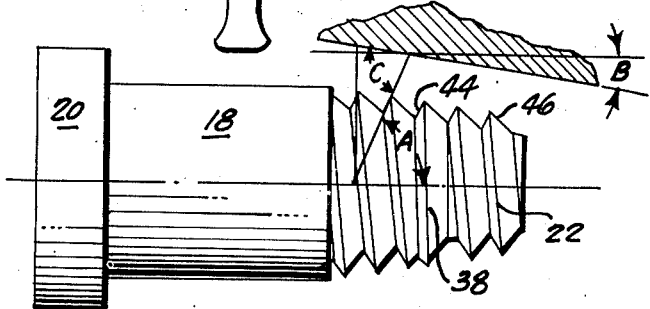
Fig. 6 is an enlarged elevational view of the rivet of Fig. 1, showing its tapered, threaded end.

The enlarged view of the rivet in Fig. 6 clearly shows its construction. The shank 18 is cylindrical and the threaded portion is moderately tapered. The thread is so formed that the pressure face 44 makes a greater angle with the axis of the shank than the relief face 46. The angle A is preferably greater than 45° to give a very strong tooth form. The pressure angle of the tooth is the complement of angle A.

The hollow tubular collar 24, preferably formed of aluminum alloy, is substantially cylindrical inside and outside and is slightly chamfered, as shown at 26. The bore is just large enough to slip readily onto the threaded end 22 into engagement with plate 12. In practicing the invention the collar is urged axially into pressural engagement with the plate 12 and at the same time is forced radially inward into the threads of the end 22.

To accomplish this result, a rivet buck 28 is held in engagement with head 20 to restrain any rearward movement of the rivet, and the rivet set or driving tool 30 is forced radially onto the collar 24. The set is provided with a substantially cylindrical bore 32, chamfered at its free end as indicated at 34. The bore may have a taper of a few degrees and is so shown in Figs. 1 and 2. This is more fully shown in Fig. 6, in which B is the angle of taper and is always less than the pressure angle, so that the resultant angle C is less than 90° With this construction the swaging action of driving tool will force the material of the collar into intimate contact with the pressure face, causing the collar to be forced tightly against the sheet to be joined and increasing the binding engagement of the collar and rivet to prevent loosening. The angle of taper of the driving tool will give greater frictional grip on the collar for rotational movement and will cause less manual fatigue to the operator because less axial pressure on the tool is required.

Figure 2:
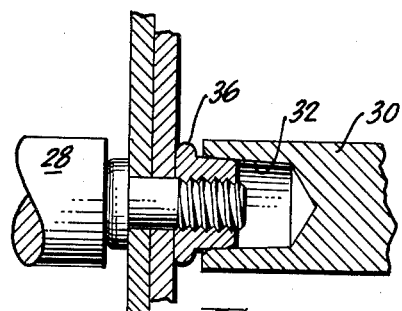
Fig. 2 is a similar view showing the joint at the completion of the riveting operations.

In operation, the chamfered edge 34 is brought into contact with the chamfered edge 26 of the collar. A slight overlap occurs before any compressive action takes place. As the set continues to move axially to the left, as in Fig. 1, it pushes the collar into firm engagement with plate 12 and at the same time swages the collar down into the threads of shank end 22. The bore 32 is, of course, slightly smaller than the outside diameter of the collar, and the relative sizes of the parts are so chosen that there is just sufficient material in the collar to fill the threads and form a small flange or upset 36 at its inner end when the driving operation is completed, as indicated in Fig. 2. The flange increases the bearing area of the collar and insures an adequate compression load on the plates between the head and the collar to produce a tight, non-working joint. Swaging the collar into the series of threads results in a much better grip than is obtained with a single annular recess.

The swaging operation causes intimate contact between the threads of the rivet and the threads formed in the collar. The frictional resistance to rotation of the collar will ordinarily prevent any possibility of loosening. However, in order to provide a positive lock, the thread is preferably deformed as indicated at 38 in Fig. 6. This may be accomplished by forging or machining a non-uniform thread during the manufacturing operation. Although this is the presently preferred form, it is obvious that other types of deformation or mutilation of the thread may be used to accomplish a similar result. It will be apparent that after the collar is swaged into such a thread there is no possibility of backing off. The deformation occurs intermediate the ends of the thread so that it will always engage the collar even though the same rivet may be used to join different thicknesses of material.

In the case of a joint which is to carry exceptionally high loads it is desirable to exert a maximum compressive stress on the plates. This is accomplished by giving the collar a partial turn just as it is finally being driven home. The threads are almost completely formed in its bore at this time and the turning action will tend to screw it into very tight engagement with plate 12. This can be accomplished even tho the outer surface of the collar is cylindrical because it is gripped tightly by the set 30 and the action is aided by the repeated hammer blows of the riveting gun.

Figure 5:
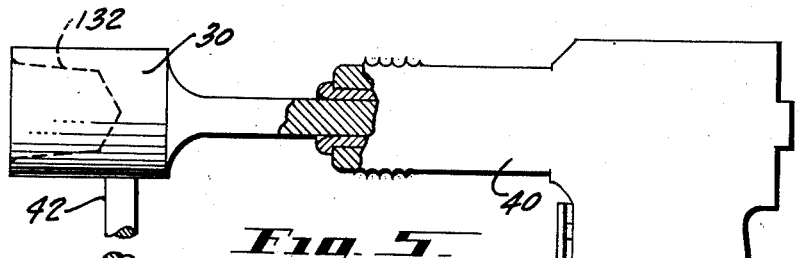
Fig. 5 is a side elevational view of a riveting tool especially adapted for the practice of the novel method.

Fig. 5 shows a suitable device for the purpose. The gun 40 is a conventional riveting gun such as is now in use in aircraft factories. The set 30 is provided with a handle or hand grip 42 with which the operator can rotate the set thru a partial turn at the appropriate time.

As the collar is rotated, additional material is forced down just ahead of the deformed thread and consequently the collar is held in its tightest driven position.

The resulting joint is tighter than can be obtained with a conventional bolt and nut and is much lighter because the improved rivet has a head of minimum size as well as a collar which is not burdened with the extra material required to form a purchase for a wrench. It is also more permanent because of the great frictional grip of the swaged threads and also the positive lock afforded by the deformed thread.

The joint is superior to that obtainable with presently known high shear rivets because far greater compression is produced and there is more resistance to loosening of the collar.

For installations that are very highly stressed, involving "maximum" shear, the pin or rivet may be made of the hardest and toughest material suited for the purpose and the collar may be made of unhardened or moderately tempered steel to provide maximum strength.

Figure 3:
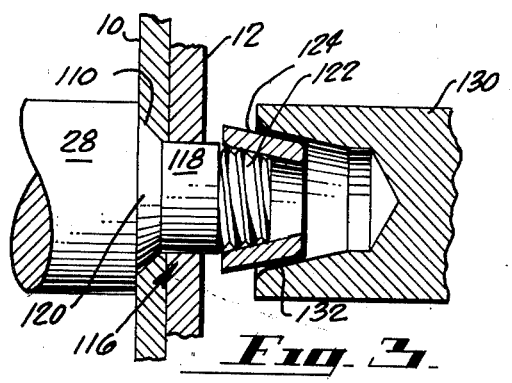
Figs. 3 and 4 are views similar to Figs. 1 and 2 with a modified form of rivet and collar.
Figure 4:
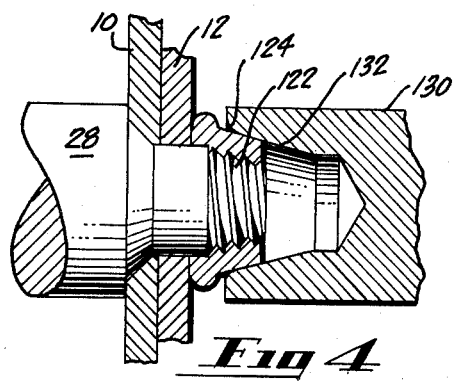

Figs. 3 and 4 show a modified from particularly suited for use where large diameter rivets or bolts are necessary. The plates 10 and 12 are joined by a rivet 116 consisting of a shank 118, a head 120, a threaded end 122, and a collar 124. In this form, the threaded end is severely tapered and the collar is made in the form of a frustum of a cone. The collar is dimensioned to fit snugly on the tapered threaded end with a small clearance between it and the plate 12. Such clearance may be of the order of an eighth of an inch. The set 130 is provided with a conical bore to match the collar. The use of a deformed thread is particularly d sirable in this modification. The setting operation is accomplished in the same manner as described with reference to Figs. 1 and 2.

Since this form is used with relatively thick sheets or plates the head 120 may be tapered to fit in countersunk opening 110 in plate 10. The taper of the threaded end and the use of a conical collar allow a substantial saving in weight without any loss of strength or permanence of the joint.

I claim:

1. In a method of uniting a plurality of apertured members with a rivet comprising a shank with a head formed on one end and a helical thread formed on the other end and a ductile collar, the steps of: inserting said shank thru said members so that its head abuts one side and its threaded end extends beyond the other side; placing said collar in position on said threaded end; restraining said shank against movement; applying axial and radial forces to said collar to flow the material of said collar into said threads and into compressive engagement with the adjacent surface of said structure; and, during the application of said axial and radial forces, applying a rotative force to the exterior surface of said collar and rotating said collar on said thread thru a partial turn to increase the effectiveness of the compressive engagement of said collar with the adjacent surface of said structure.

2. A device for attaching together a plurality of members having aligned apertures therethru comprising: a hard, relatively high strength pin having an enlarged permanent head formed at a first end thereof; said pin having a first shank portion extending from said head toward the second end of said pin, said first portion having a smooth cylindrical surface of a diameter to snugly engage said apertures and being extendable therethru; said pin having a second shank portion extending from the end of said first portion to the second end of said pin, said second portion having a single continuous unidirectional thread formed on its surface and extending thruout its length; an intermediate portion of said thread bearing a locking deformation; and a malleable collar of substantially the same length as said second shank portion adapted to be mounted thereon and to be swaged into the threaded surface thereof in compressive engagement with the outer face only of the sheet farthest removed from the headed end of said pin and to be rotated thereon to increase the compressive engagement; said second shank portion being tapered and the diameter of its free end being substantially smaller than that of said first shank portion.

HESTER B. TORRESEN.

REFERENCES CITED

The following references are of record in the file of this patent:

UNITED STATES PATENTS

| Number | Name | Date |
|---|---|---|
| 348,426 | Shellenberger | Aug. 31, 1886 |
| 462,318 | Loehner | Nov. 3, 1891 |
| 597,000 | Higbee | Jan. 11, 1898 |
| 1,067,755 | Price | July 15, 1913 |
| 1,346,058 | Robergel | July 6, 1920 |
| 2,001,145 | Lambert | May 14, 1935 |
| 2,001,290 | Thomson | May 14, 1935 |
| 2,061,628 | Huck | Nov. 24, 1936 |
| 2,349,593 | Hosking | May 23, 1944 |
| 2,355,580 | Wing | Aug. 8, 1944 |
| 2,396,661 | Keller | Mar. 19, 1946 |
| 2,397,076 | Keller | Mar. 19, 1946 |